(12) United States Patent
Kutik et al.

(10) Patent No.: US 11,422,850 B1
(45) Date of Patent: Aug. 23, 2022

(54) BEHAVIOR TOGGLE FOR STATEFUL APPLICATIONS

(71) Applicant: SAP SE, Walldorf (DE)

(72) Inventors: Michael Kutik, Berlin (DE); Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/230,306

(22) Filed: Apr. 14, 2021

Related U.S. Application Data

(60) Provisional application No. 63/168,758, filed on Mar. 31, 2021.

(51) Int. Cl.
| | | |
|---|---|---|
| *G06F 9/44* | (2018.01) | |
| *G06F 9/48* | (2006.01) | |
| *G06F 9/445* | (2018.01) | |

(52) U.S. Cl.
CPC ........ *G06F 9/4843* (2013.01); *G06F 9/44536* (2013.01)

(58) Field of Classification Search
CPC .................................................. G06F 9/4843
USPC ....................................................... 719/320
See application file for complete search history.

(56) References Cited

U.S. PATENT DOCUMENTS

| | | | | |
|---|---|---|---|---|
| 8,261,297 | B2* | 9/2012 | Kabanov | G06F 11/3696 |
| | | | | 719/332 |
| 10,528,367 | B1* | 1/2020 | Liu | G06F 9/4498 |
| 2019/0018703 | A1* | 1/2019 | Sedovic | G06F 16/27 |
| 2019/0205186 | A1* | 7/2019 | Zhang | G06F 9/4881 |

* cited by examiner

*Primary Examiner* — Timothy A Mudrick
(74) *Attorney, Agent, or Firm* — Schwegman Lundberg & Woessner, P.A.

(57) ABSTRACT

In an example embodiment, a specialized software object, called a behavior toggle, is utilized for stateful applications in cloud environments. The behavior toggle, once enabled and used by an entity, is not able to be disabled anymore for that entity, other than by explicit migration. Unlike feature toggles, whose values are expressed using "true" or "false" flags or the like, behavior toggles are enabled by specific version. Specifically, the value indicates which version of the behavior is enabled. The behavior toggle software objects may then be referenced by, or included in, other software objects, to utilize the behavior toggle software objects with the other software objects and have the behavior toggle be applied to the other software objects.

20 Claims, 8 Drawing Sheets

BEHAVIOR TOGGLE FOR STATEFUL APPLICATIONS

TECHNICAL FIELD

This document generally relates to stateful software applications. More specifically, this document relates to using a behavior toggle for stateful applications.

BACKGROUND

Users today are inundated with and exposed to a large number of different software solutions, each with their own workflows that need to be followed in order to accomplish a task. This can be very difficult for users, especially when they are trying out new software or new features of existing software, as users are often at a loss as to how to accomplish a task in the new software or feature. Users commonly will get lost, frustrated, or even give up on using the software or feature because there is no proper guidance as to how it should be used to accomplish the particular tasks important to the user. Fundamentally, they lack context-aware product support.

Solutions for this problem have to this point only come in the form of non-context aware product support, such as bots. Bots are scenario-specific, but still lack the context needed to provide context-specific support. What is needed is a solution that solves this technical issue.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
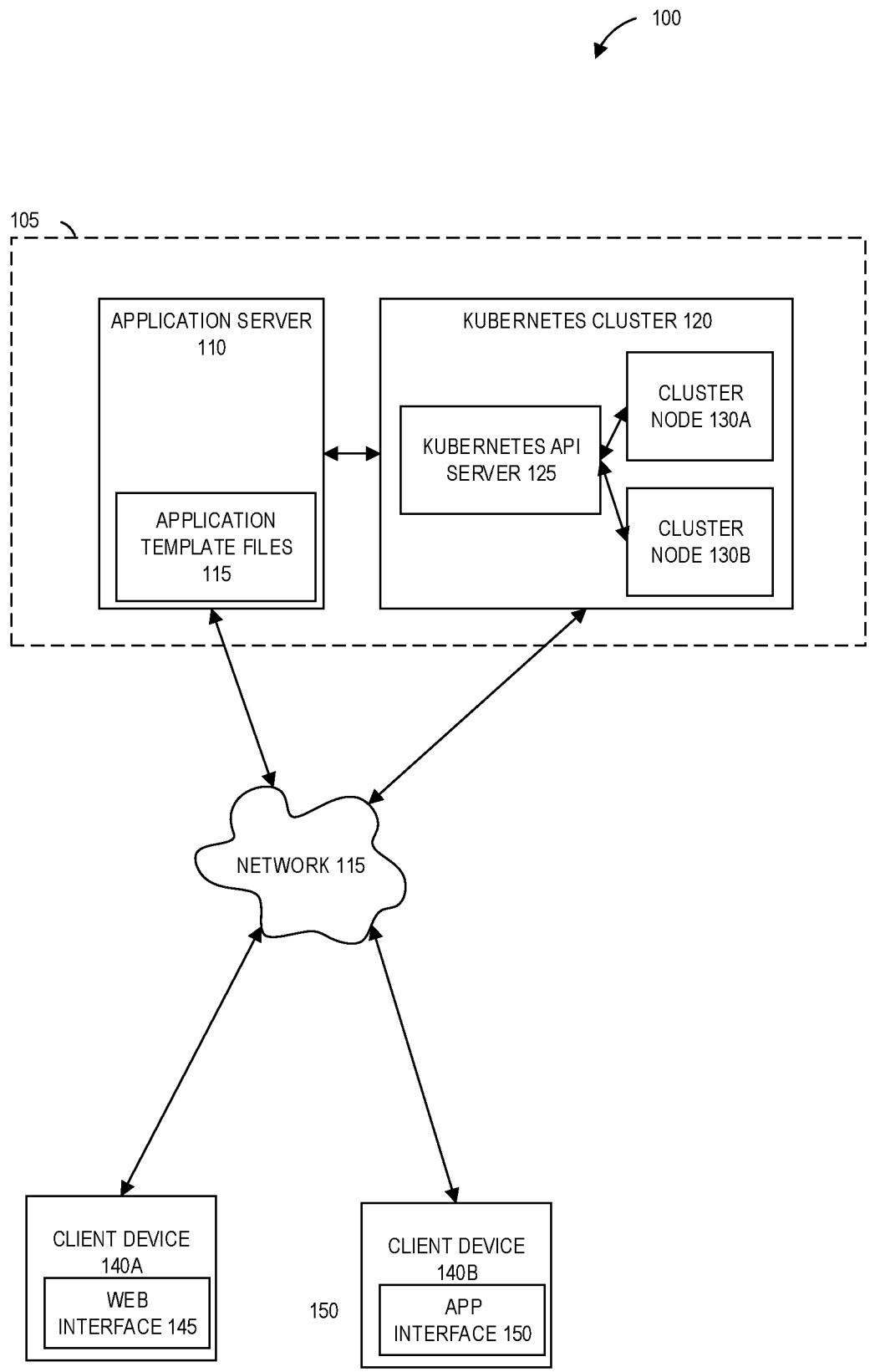
FIG. 1 is a network diagram illustrating a network environment suitable for using Kubernetes as a distributed operating system for a scalable application system, according to some example embodiments.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a specialized software object, called a behavior toggle, is utilized for stateful applications in cloud environments. The behavior toggle, once enabled and used by an entity, is not able to be disabled anymore for that entity, other than by explicit migration. Unlike feature toggles, whose values are expressed using "true" or "false" flags or the like, behavior toggles are enabled by specific version. Specifically, the value indicates which version of the behavior is enabled. The behavior toggle software objects may then be referenced by, or included in, other software objects, to utilize the behavior toggle software objects with the other software objects and have the behavior toggle be applied to the other software objects.

In an example embodiment, the behavior toggle may be used in the context of a containerized application. In such embodiments, the behavior toggle software object(s) may be included in the container with the software application. Versions of the software application instantiated using that container will therefore have the corresponding behavior either enabled or non-enabled based on the version of the application instantiated and the value in the behavior toggle, but the behavior toggle is also prevented from being switched in an already instantiated application version. The most a user can do is to migrate the instantiated application version to a later application version whose value is in the behavior toggle, which would enable the corresponding behavior.

Kubernetes is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Kubernetes containers, by virtue of being so modular, are quite conducive to scaling of in-memory database instances. Kubernetes containers are called pods. Each pod is scheduled on a specific host and encapsulates a container for each of one or more applications. If the host becomes unavailable, Kubernetes automatically instantiates the instance on a different host, greatly easing maintenance.

A stateful service is one in which state data is persisted. An in-memory database may be used to persist the state for these stateful services, but they can be managed in Kubernetes clusters using an application program interface (API) extension of a custom resource definition (CRD). A CRD is a set of parameters used by Kubernetes in managing the lifecycle of Kubernetes objects, such as pods. In an example embodiment, stateful applications managed by Kubernetes custom resources are utilized with the behavior toggles. That is, the lifecycle of the stateful application is managed by a custom resource and its controller. This concept is known as a Kubernetes operator.

Lifecycle of the application would include provisioning and decommissioning application instances, as well as any configuration changes of the applications other than actually using the application.

Docker™ is a tool for creating, deploying, and running applications using containers.

FIG. 1 is a network diagram illustrating a network environment 100 suitable for using Kubernetes as a distributed operating system for a scalable application system, according to some example embodiments. The network environment 100 includes a network-based application 105, client devices 140A and 140B, and a network 115. The network-based application 105 is provided by an application server 110 in communication with a Kubernetes cluster 120. The application server 110 accesses application template files 115 to configure and deploy an application to the Kubernetes cluster 120 via the Kubernetes API server 125 interacting with a set of cluster nodes 130A, 130B. The containerized application is provided to the client devices 140A and 140B via a web interface 145 or an application interface 150. The application server 110, the Kubernetes API server 125, the cluster nodes 130A and 130B, and the client devices 140A and 140B may each be implemented in a computer system, in whole or in part, as described below with respect to FIG. 8. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes API server 125 provides an interface to the Kubernetes cluster 120 and deploys applications to the cluster nodes 130. The selected application may be invoked via a virtual system application. The client device 140 may provide identifying information to the application server 110, and the identifying information may be used by the Kubernetes API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes API server 125, the cluster nodes 130A-130B, and the client devices 140A-140B may be connected by the network 115. The network 115 may be any network that enables communication between or among machines, databases, and devices. Accordingly, the network 115 may be a wired network, a wireless network (e.g., a mobile or cellular network), or any suitable combination thereof. The network 115 may include one or more portions that constitute a private network, a public network (e.g., the Internet), or any suitable combination thereof.

Figure 2:
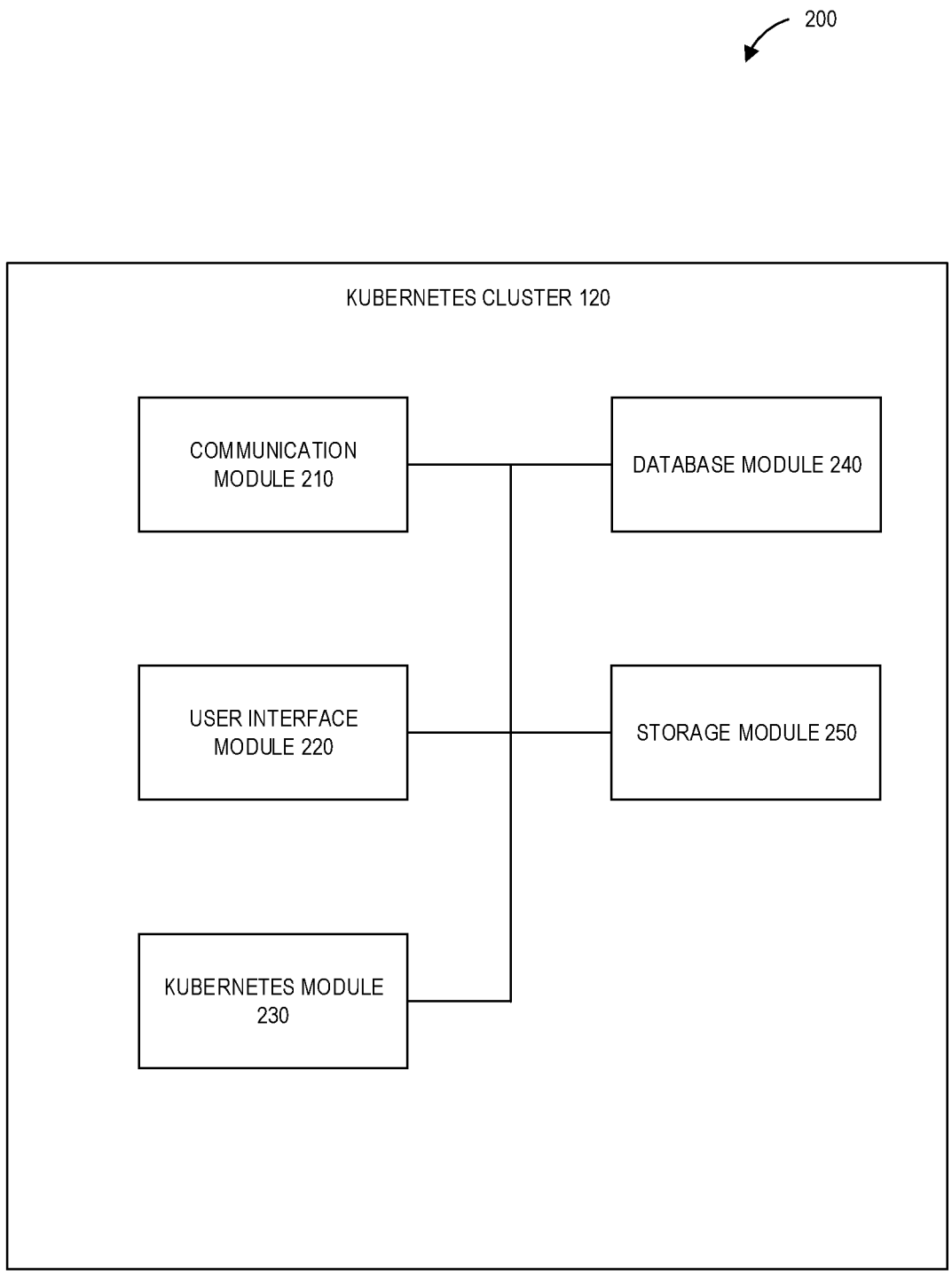
FIG. 2 is a block diagram illustrating components of the Kubernetes cluster, according to some example embodiments.

FIG. 2 is a block diagram 200 illustrating components of the Kubernetes cluster 120, according to some example embodiments. The Kubernetes cluster 120 is shown as including a communication module 210, a user interface module 220, a Kubernetes module 230, a database module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the Kubernetes cluster 120 and transmits data from the Kubernetes cluster 120. For example, the communication module 210 may receive, from the client device 140A, data for a selected application. The communication module 210 provides the data to the Kubernetes module 230. The Kubernetes module 230 communicates with the Kubernetes API server 125 to cause one or more of the cluster nodes 130, via a virtual system application, to execute the application. The cluster nodes 130 executing the application communicate with the client device 140A via the network 115 to provide the selected application. In some example embodiments, data from the file is stored in a database via the database module 240 and the storage module 250. After being stored, the data may be accessed from the database. The communication module 210 may transmit a user interface from the user interface module 220 to the client device 140A that includes data for available applications. The list of available applications may be generated by accessing a manifest file that identifies the available applications, by accessing a directory that contains the files, in the standardized format, for the available applications, by accessing a table in a database that contains entries for the available applications, or any suitable combination thereof. Communications sent and received by the communication module 210 may be intermediated by the network 115.

The user interface module 220 causes presentation of a user interface for the Kubernetes cluster 120 on a display associated with the client device 140A or 140B. The user interface allows a user to select an application from a list of applications, to interact with an application, or any suitable combination thereof.

Figure 3:
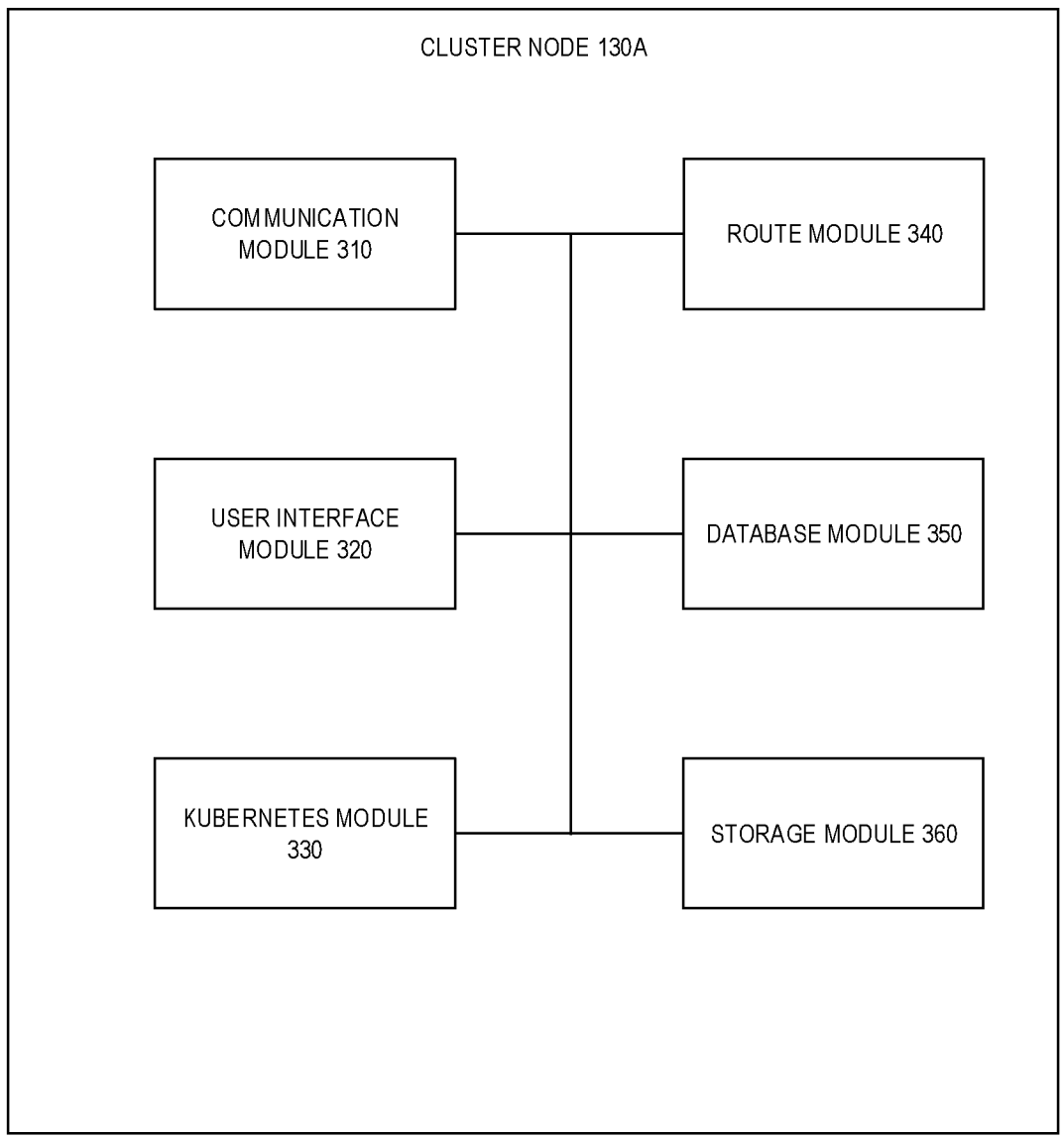
FIG. 3 is a block diagram illustrating components of the cluster node, according to some example embodiments.

FIG. 3 is a block diagram illustrating components of the cluster node 130A, according to some example embodiments. The cluster node 130A is shown as including a communication module 310, a user interface module 320, a Kubernetes module 330, a route module 340, a database module 350, and a storage module 360, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the cluster node 130A and transmits data from the cluster node 130A. For example, the communication module 310 may receive, from the Kubernetes API server 125, a request to use an application via a virtual system. The request may identify a user, a client device, a tenant, or any suitable combination thereof. The communication module 310 provides the data to the Kubernetes module 330. The route module 340, invoked by the Kubernetes module 330, determines which instance of the application to connect the client device to. The cluster node 130A, executing the instance of the application, communicates with the client device 140A via the network 115 to provide the application. In some example embodiments, data for the tenant is stored in a database via the database module 350 and the storage module 360. After being stored, the data may be accessed from the database. The communication module 310 may transmit a user interface from the user interface module 320 to the client device 140A that includes data for the application instance. Communications sent and received by the communication module 310 may be intermediated by the network 115.

The user interface module 320 causes presentation of a user interface for the cluster node 130A on a display associated with the client device 140A or 140B. The user interface allows a user to interact with the application instance.

In an example embodiment, the description of a behavior toggle may be combined with the behavior of a feature toggle in a single description. While this would ease distribution of the behavior toggle, it is not strictly necessary and in some embodiments the behavior toggle may be in a different description than the feature toggle. An example of a shared description is provided below:

```
{
    "Toggles": {
        "Features": [
            {
                "name": "someStatelessFeature",
                "description": "some text describing the feature"
                "value": true
            }
        ],
        "Behaviors": [
            {
                "name": "superAdminUserHandling",
                "description": "some text describing the behavior"
                "value": "v2",
                "versions": [
                    {
                        "version": "v2",
                        "description": "some useful text
                        explaining version 2"
                    },
                    {
                        "version": "v1",
                        "description": "some more useful text
                        explaining version 1"
                    }
```

```
                ]
            }
        ]
    }
}
```

The stateless feature "someStatelessFeature" is toggled by editing its value field. It could be either "true" or "false" in the global runtime environment. Thus, it is a feature toggle that is depicted as being enabled (because its value is true). A user could toggle this feature to disabled by changing the value from "true" to "false" (or enable it by changing the value from "false" to "true"). The same is not true for the behavior feature, here listed as "superAdminUserHandling". Here, the value is neither true nor false but a version number, with the value indicating which version number has the behavior enabled. Thus, a user is unable to "toggle" this behavior directly. The stateful behavior "superAdminUserHandling" cannot be turned off. It either is or is not used according to its versions, which are variants of it. Like the stateless feature, a behavior has an enabled version, which is set in the global runtime environment. In the example above it would be used in version "v2".

When toggling a behavior with respect to the lifecycle of that stateful application, the behavior previously chosen for the actual to-be-reconciled instance of the stateful application should be taken into consideration. To achieve that, a subsequent reconciliation of a stateful application's instance needs to be able to learn about the exact versions of respective behaviors used to provision or configure the stateful application instance. In an example embodiment, a behavior toggle context is introduced to the Custom Resource used to manage the stateful application instance. The behavior toggle context is expressed as annotation with the Custom Resource, such as in the following:

```
.
    apiVersion: sample.api.com/v1
    kind: StatefulApplication
    name: application
    namespace: default
    metadata:
        annotations:
            behaviorToggles:
                sample.api.com/superAdminUserHandling: v1
            ...
        spec:
            ...
        status:
            ...
```

Figure 4:
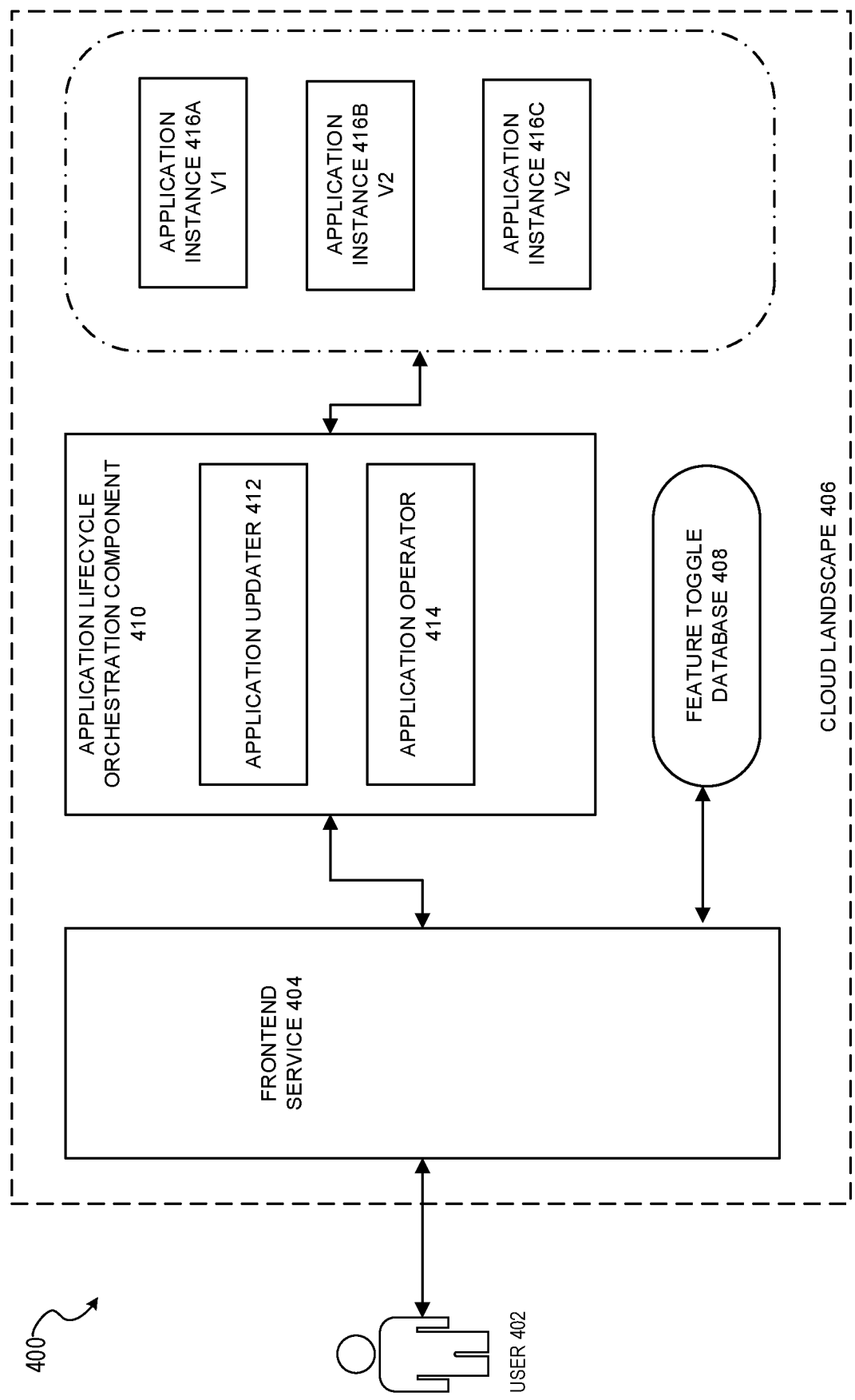
FIG. 4 is a block diagram illustrating a system using a behavior toggle, in accordance with an example embodiment.

FIG. 4 is a block diagram illustrating a system 400 using a behavior toggle, in accordance with an example embodiment. User 402 interacts with a frontend service 404 in a cloud landscape 406. Feature toggle database 408 contains the feature and behavior toggle descriptions and enablements. Application lifecycle orchestration component 410 uses the feature toggle database 408 to determine the behavior versions that are currently selected as the default and that therefore should be used for provisioning. The application lifecycle orchestration component 410 includes an application updater 412 and an application operator 414. The application lifecycle orchestration component 410 retrieves a behavior toggle context from an application instance (such as application instance 416A, 416B, or 416C) to determine the behavior version to be used for configuration changes (in contrast to using, for example, the value within a feature toggle itself to determine whether a feature is enabled). The application updater 412 uses the feature toggle database 408 and the behavior toggle context to check for behavior migrations.

Figure 5:
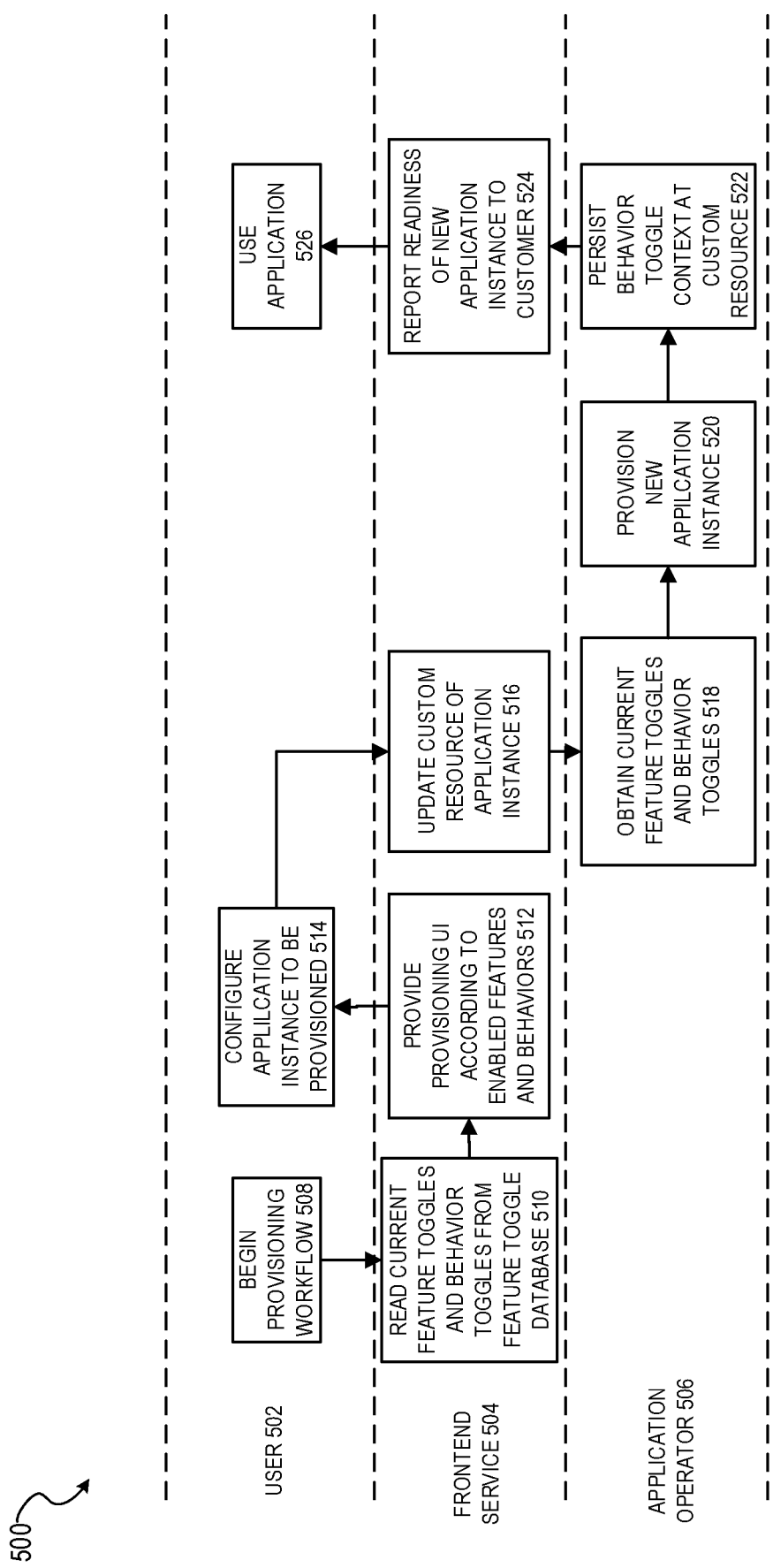
FIG. 5 is a sequence diagram illustrating a method for provisioning a stateful application instance, in accordance with an example embodiment.

FIG. 5 is a sequence diagram illustrating a method 500 for provisioning a stateful application instance, in accordance with an example embodiment. The method 500 may utilize a user 502, frontend service 504, and application operator 506. At operation 508, the user 502 beings a provisioning workflow. At operation 510, the frontend service 504 reads current feature toggles and behavior toggles from the feature toggle database. Then at operation 512, the frontend service 504 provides a provisioning user interface according to enabled features and behaviors of the read current feature toggles and behavior toggles. At operation 514, the user 502 configures an application instance to be provisioned.

At operation 516, the frontend service 504 updates the custom resource of the application instance. At operation 518, the application operator 506 then obtains the current feature toggles and behavior toggles from the frontend service 504. At operation 520, the application operator 506 provisions the new application instance. At operation 522, the application operator 506 persists the behavior toggle context at the custom resource. At operation 524, the frontend service 504 reports the readiness of the new application instance. Then at operation 526, the user 502 may use the application.

With respect to migration of stateful behaviors, there are three types of behaviors to consider: non-migratable behaviors, implicitly migratable behaviors, and explicitly migratable behaviors. A behavior is provided by an entity, called the behavior provider. In an example embodiment, behaviors are exposed to consuming entities through application program interfaces (APIs), such as Structured Query Language (SQL), Representational State Transfer (REST), or proprietary APIs.

Migration only applies to already-existing application instances. It may become necessary after or as a part of a version upgrade for an application instance.

Assume a stateful legacy application, for example a database system. Assume services that manage the lifecycle of instances of this application in a cloud environment. New versions of this application are rolled out to production. This rollout makes them available for provisioning and update of application instances. The rollout of a new version itself does not affect already-running application instances.

Assume a breaking change introduced by a new version of the behavior provider (application). This breaking change requires the behavior consumer (application operator and other orchestration services) to use a different API or to use the existing API differently, depending on the version of the behavior provider. The behavior toggle description designates the behavior version to be used as default, when provisioning new application instances. To change the default behavior version to the used, the behavior toggle description has to be updated as part of a rollout to production.

Non-migratable behaviors cannot be changed after initial creation of an application instance. As a consequence of the user version of the behavior, the state of the application instance was modified in a way that prohibits converting the state of the application instance to match the state that would have been created as a consequence of using another version of that behavior. In an example embodiment, there may be an additional field in the description indicating that the behavior toggle is non-migratable. There might be a means to choose the behavior version to use during creation, through configuration of the application instance.

The application operator reads the default behavior version from the toggle context handed down to it by the frontend service during provisioning. If the configuration is required to create the system to match the default behavior version, the application operator performs the necessary steps.

These behaviors are fixed with provisioning of an application instance. They cannot be changed throughout the lifetime of this application instance, even when the application instance is migrated to a different version. The behavior version used is annotated at the application instance. The behavior consumer then has to check the corresponding behavior toggle value annotated to the application instance it is consuming, to determine which API or which flavor of the same API it has to use to perform its task.

For explicit migration of a stateful behavior, assume a behavior of the behavior provider, the versions of which result in states that are convertible at least towards newer versions of the behavior. Assume further the migration of the application instance to support a newer version of the behavior causes downtimes or other impacts to customers, such as the need to install and use new drivers for SQL access to a database, or to modify the customers' applications. In cases like these, either the operators of the cloud landscape or the customer needs to control when the migration will take place, and the migration will be triggered explicitly.

Assume an application instance running in a cloud landscape. Further assume the application instance runs with Behavior version v1 of Behavior X, with this information annotated at the application instance. Further assume that Behavior version v2 of Behavior X has become the default (as specified in the description). Assume, as an example, the application operator is capable of migrating the application instance from Behavior version v1 of Behavior X to behavior version v2. Also assume a migration that does not require the customer to change its consuming applications or usage of the application instance provisioned in the cloud landscape. Further assume the migration will cause a service disruption or downtime. Operators of the cloud landscape will use a script or manual change to trigger the migration of the already running system.

In such a case, the cloud landscape operators (humans) will plan the migration for a maintenance window. When the maintenance window takes place, the human operator will log on to the cloud landscape and, through script or command, change the behavior annotation for Behavior X from version v1 to version v2.

Now assume a migration that does require the customer to change its consuming applications or usage of the application instance provisioned in the cloud landscape. The frontend service will offer a means to the customer to trigger the migration at his or her own will. The customer could schedule a maintenance window for its consuming applications to perform the migration. Operators of the customer may use the means offered by the frontend service to trigger the migration of an already running system.

In such a case, the frontend service may update the behavior annotation of the application instance to the new Behavior version v2.

In both cases, the application operator would recognize the change and could reconfigure the application instance accordingly, including restarting it. After the reconfiguration and restart, the application instance will run with Behavior version v2 of Behavior X.

Reconfiguration of application instance includes changing the configuration of the application instance itself or modifying the networking rules, security rules, and the like used for running the application instance in a cloud landscape.

For implicit migration of a stateful behavior, assume a behavior of the Behavior Provider (application), the versions of which result in states that are convertible at least towards newer versions of the behavior. Assume the migration of the application instance to support a newer version of a behavior could be done transparently to the customers. Here, there is no need to install and use new drivers for SQL access to a database, or to modify the customers' applications, and no downtimes are required.

In cases like this, the migration from behavior version v1 of a Behavior X to behavior version v2 of that behavior could be performed automatically anytime.

Now assume a migration that does not require the customer to change its consuming applications or usage of the application instance provisioned in the cloud landscape. Further assume the migration will not cause a service disruption or downtime. Additionally assume an application instance running in a cloud landscape. Further assume the application instance is running with Behavior version v1 of Behavior X, with this information annotated at the application instance. Further assume that Behavior version v2 of Behavior X has become the default. As an example, the application operator may be capable of migrating the application instance from Behavior version v1 of Behavior X to Behavior version v2, and the application operator may be capable of detecting a change to the default version of a behavior relevant for the application instances it manages.

In such cases, the deployment tooling of the cloud landscape rolls a new version of the Behavior Toggle description of Behavior X. The new version of Behavior X's Behavior Toggle description changes the default version of Behavior X from v1 to v2. The application operator detects the change of the default version for Behavior X, at which point it collects all application instances running with Behavior version v1 of Behavior X. The application operator would then reconfigure the application instance accordingly. After the reconfiguration the behavior annotation of the application instance is updated to reflect the new version of Behavior X used.

Reconfiguration of an application instance includes changing the configuration of the application instance itself or modifying the networking rules, security rules and the like used and required for running the application instance in a cloud landscape.

Figure 6:
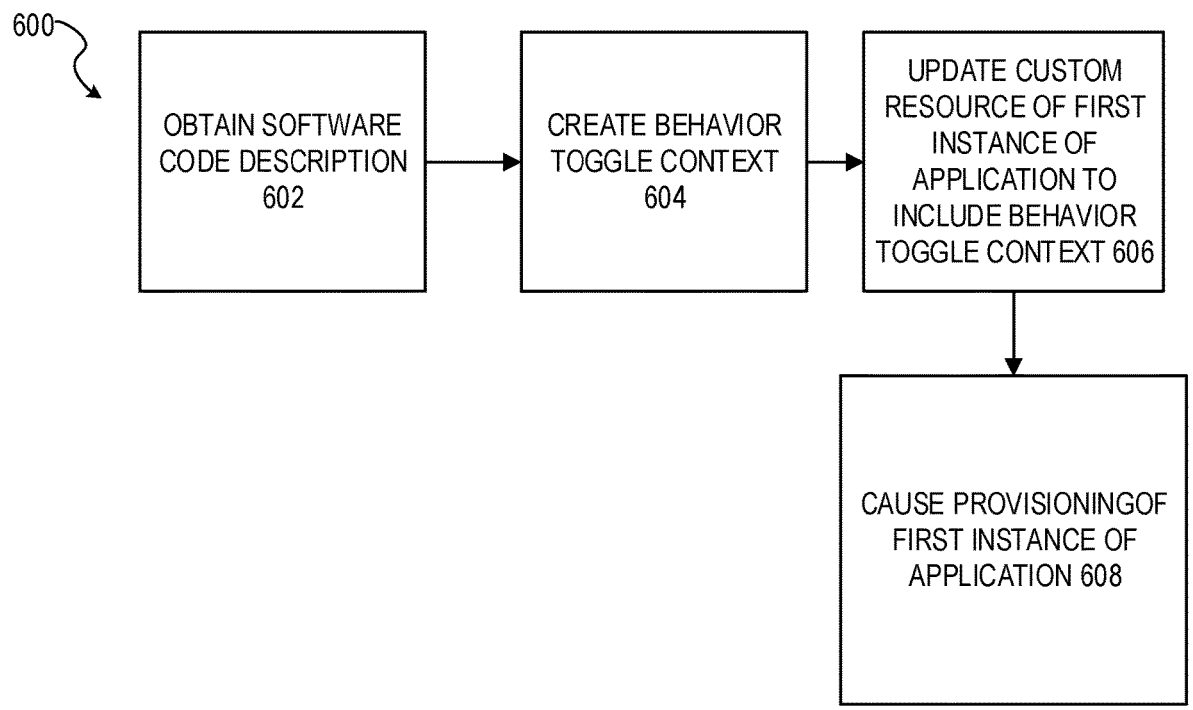
FIG. 6 is a flow diagram illustrating a method of utilizing a behavior toggle in accordance with an example embodiment.

FIG. 6 is a flow diagram illustrating a method 600 of utilizing a behavior toggle in accordance with an example embodiment. At operation 602, a software code description, stored in a database, is obtained. The software code description includes a behavior toggle, the behavior toggle describing a plurality of variants of a behavior and including a value identifying which variant is permitted to be performed by an application. The software code description may also include a feature toggle, which describes a feature that is permitted to be used by the application and including a value identifying whether the feature is enabled or disabled. The behavior cannot be disabled in the first instance of the application without migrating the first instance of the application to a different version of the application. It should be noted that for purposes of this operation, the application instance shall be interpreted to include the application instance itself along everything else that is created when an application instance is provisioned, which would include artifacts, services, and configurations related to the instance.

At operation 604, a behavior toggle context is created identifying the behavior toggle variant indicated by the value in the software code description. At operation 606, a custom resource of a first instance of the application, in a containerized application management service, is updated to include the behavior toggle context. At operation 608, the system causes provisioning of the first instance of the application, using the custom resource, thereby enabling the behavior by the first instance of the application.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
obtaining a software code description stored in a database, the software code description including a behavior toggle, the behavior toggle describing a plurality of variants of a behavior and including a value identifying which variant is permitted to be performed by an application;
creating a behavior toggle context identifying the behavior toggle included in the software code description;
updating a custom resource of a first instance of the application, in a containerized application management service, to include the behavior toggle context; and
causing provisioning of the application, using the custom resource, the provisioning enabling the behavior by the first instance of the application.

Example 2. The system of Example 1, wherein the behavior cannot be disabled in the first instance of the application without migrating the first instance of the application to a different version of the application.

Example 3. The system of Examples 1 or 2, wherein the software code description further includes a feature toggle, the feature toggle describing a feature that is permitted to be used by the application and including a value identifying whether the feature is enabled or disabled.

Example 4. The system of Example 3, wherein the operations further comprise disabling the feature in the first instance of the application by changing the value in the feature toggled to a value indicating that the feature is disabled, without migrating the first instance of the application to a different version of the application.

Example 5. The system of any of Examples 1-4, wherein the operations are performed by a frontend service in a cloud landscape.

Example 6. The system of any of Example 1-5, wherein the provisioning is performed by an application operator in an application lifecycle orchestration component in the cloud landscape.

Example 7. The system of any of Examples 1-6, wherein the containerized application management service is Kubernetes.

Example 8. The system of any of Examples 1-7, wherein the operations further comprise:
detecting a change to the value in the software code description; and
in response to the detection, automatically migrating the first instance of the application to a version of the application matching the changed value.

Example 9. A method comprising:

obtaining a software code description stored in a database, the software code description including a behavior toggle, the behavior toggle describing a plurality of variants of a behavior and including a value identifying which variant is permitted to be performed by an application;

creating a behavior toggle context identifying the behavior toggle included in the software code description;

updating a custom resource of a first instance of the application, in a containerized application management service, to include the behavior toggle context; and causing provisioning of the application, using the custom resource, the provisioning enabling the behavior by the first instance of the application.

Example 10. The method of Example 9, wherein the behavior cannot be disabled in the first instance of the application without migrating the first instance of the application to a different version of the application.

Example 11. The method of Examples 9 or 10, wherein the software code description further includes a feature toggle, the feature toggle describing a feature that is permitted to be used by the application and including a value identifying whether the feature is enabled or disabled.

Example 12. The method of Example 11, wherein the operations further comprise disabling the feature in the first instance of the application by changing the value in the feature toggled to a value indicating that the feature is disabled, without migrating the first instance of the application to a different version of the application.

Example 13. The method of any of Examples 9-12, wherein the method is performed by a frontend service in a cloud landscape.

Example 14. The method of any of Examples 9-13, wherein the provisioning is performed by an application operator in an application lifecycle orchestration component in the cloud landscape.

Example 15. The method of any of Examples 9-14, wherein the containerized application management service is Kubernetes.

Example 16. The method of any of Examples 9-15, further comprising:

detecting a change to the value in the software code description; and in response to the detection, automatically migrating the first instance of the application to a version of the application matching the changed value.

Example 17. A non-transitory machine-readable medium storing instructions which, when executed by one or more processors, cause the one or more processors to perform operations comprising:

obtaining a software code description stored in a database, the software code description including a behavior toggle, the behavior toggle describing a plurality of variants of a behavior and including a value identifying which variant is permitted to be performed by an application;

creating a behavior toggle context identifying the behavior toggle included in the software code description;

updating a custom resource of a first instance of the application, in a containerized application management service, to include the behavior toggle context; and causing provisioning of the application, using the custom resource, the provisioning enabling the behavior by the first instance of the application.

Example 18. The non-transitory machine-readable medium of Example 17, wherein the behavior cannot be disabled in the first instance of the application without migrating the first instance of the application to a different version of the application.

Example 19. The non-transitory machine-readable medium of Examples 17 or 18, wherein the software code description further includes a feature toggle, the feature toggle describing a feature that is permitted to be used by the application and including a value identifying whether the feature is enabled or disabled.

Example 20. The non-transitory machine-readable medium of Example 19, wherein the operations further comprise disabling the feature in the first instance of the application by changing the value in the feature toggled to a value indicating that the feature is disabled, without migrating the first instance of the application to a different version of the application.

Figure 7:
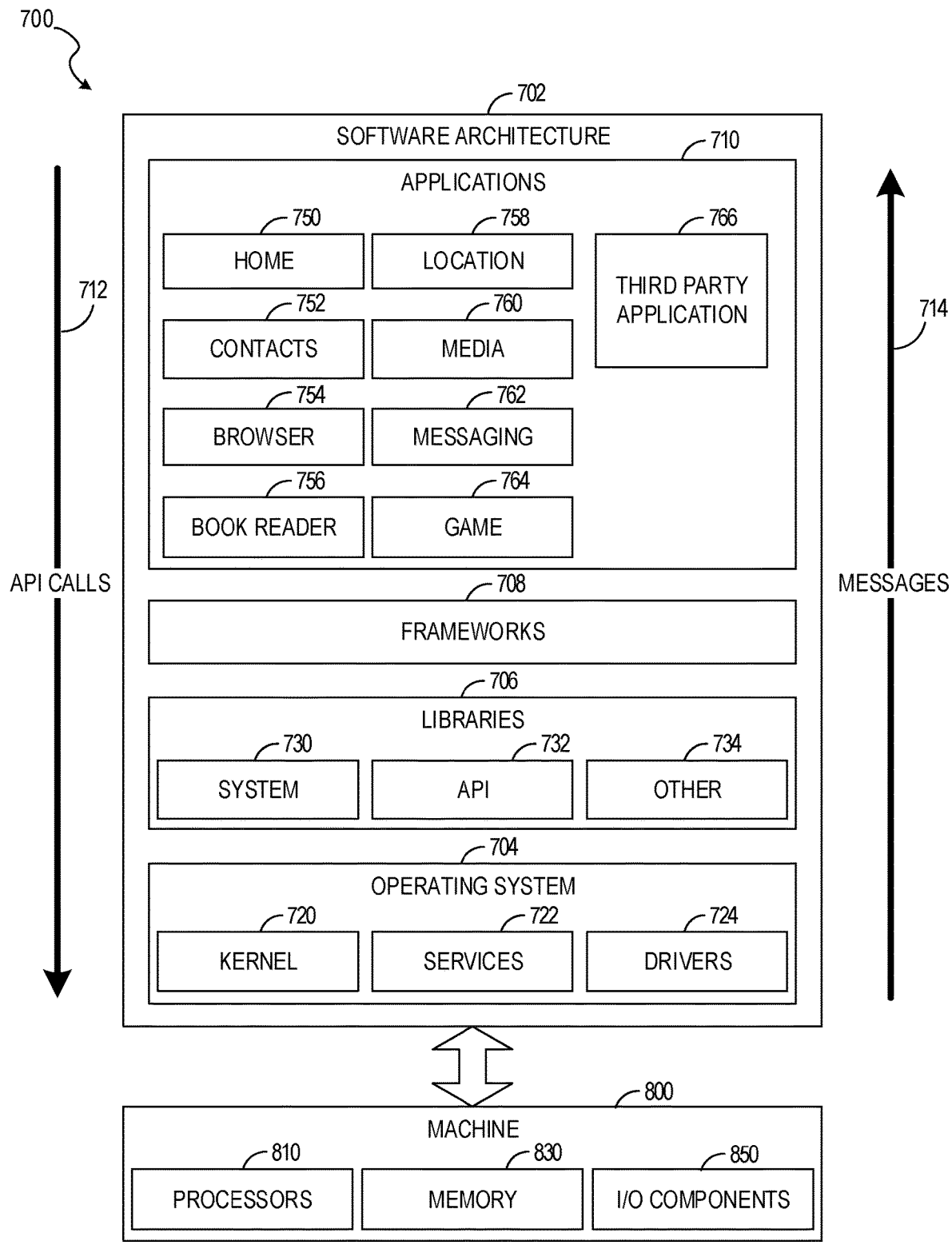
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
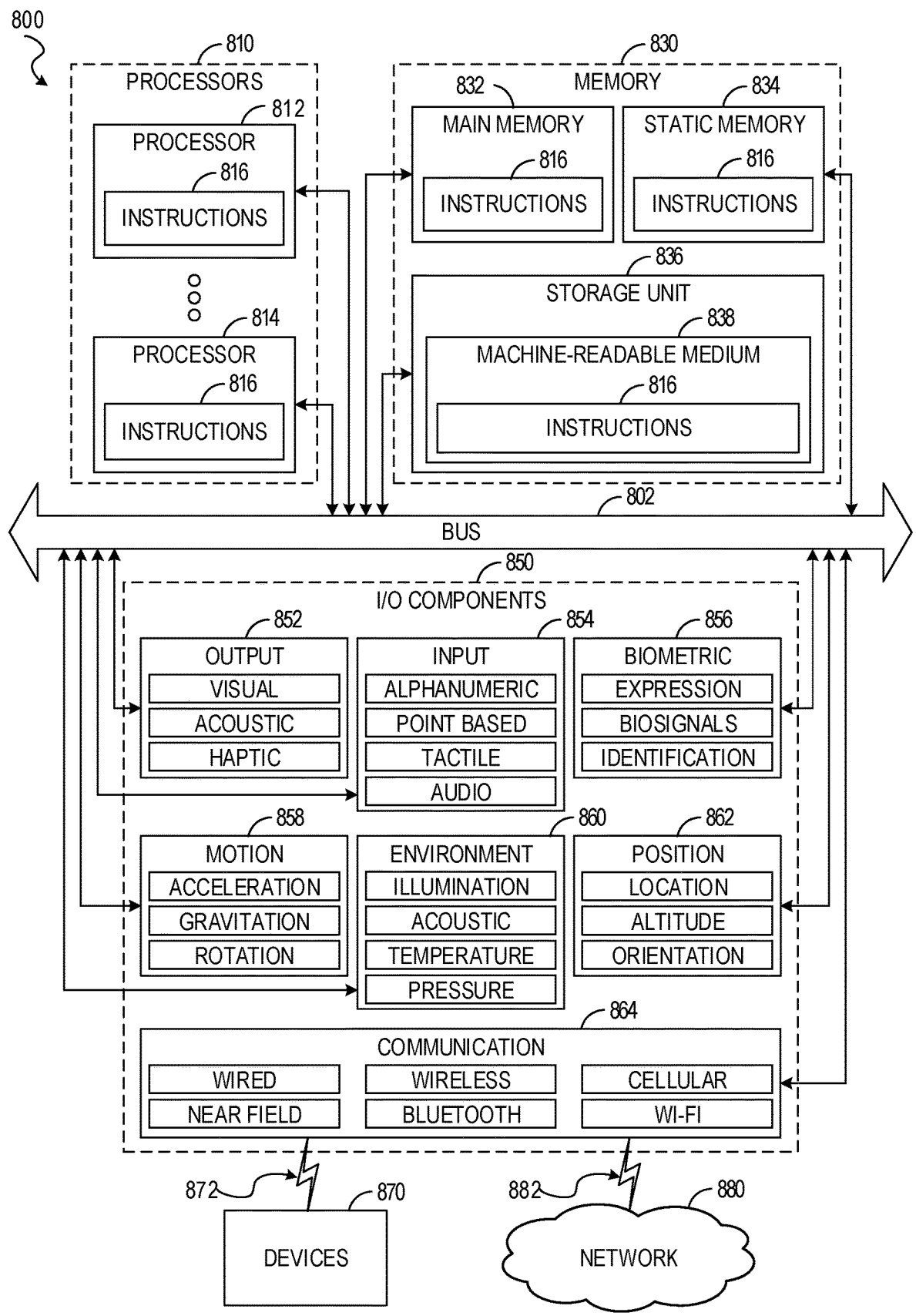
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIGS. 4 and 5. Additionally, or alternatively, the instructions 816 may implement FIGS. 1-4 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
      obtaining a software code description stored in a database, the software code description including a behavior toggle, the behavior toggle describing a plurality of variants of a behavior and including a value identifying which variant is permitted to be performed by an application;
      creating a behavior toggle context identifying the behavior toggle included in the software code description;
      updating a custom resource of a first instance of the application, in a containerized application management service, to include the behavior toggle context; and
      causing provisioning of the application, using the custom resource, the provisioning enabling the behavior by the first instance of the application.

2. The system of claim 1, wherein the behavior cannot be disabled in the first instance of the application without migrating the first instance of the application to a different version of the application.

3. The system of claim 1, wherein the software code description further includes a feature toggle, the feature toggle describing a feature that is permitted to be used by the application and including a value identifying whether the feature is enabled or disabled.

4. The system of claim 3, wherein the operations further comprise disabling the feature in the first instance of the application by changing the value in the feature toggle to a value indicating that the feature is disabled, without migrating the first instance of the application to a different version of the application.

5. The system of claim 1, wherein the operations are performed by a frontend service in a cloud landscape.

6. The system of claim 5, wherein the provisioning is performed by an application operator in an application lifecycle orchestration component in the cloud landscape.

7. The system of claim 1, wherein the containerized application management service is Kubernetes.

8. The system of claim 1, wherein the operations further comprise:
   detecting a change to the value in the software code description; and
   in response to the detection, automatically migrating the first instance of the application to a version of the application matching the changed value.

9. A method comprising:
   obtaining a software code description stored in a database, the software code description including a behavior toggle, the behavior toggle describing a plurality of variants of a behavior and including a value identifying which variant is permitted to be performed by an application;
   creating a behavior toggle context identifying the behavior toggle included in the software code description;
   updating a custom resource of a first instance of the application, in a containerized application management service, to include the behavior toggle context; and
   causing provisioning of the application, using the custom resource, the provisioning enabling the behavior by the first instance of the application.

10. The method of claim 9, wherein the behavior cannot be disabled in the first instance of the application without migrating the first instance of the application to a different version of the application.

11. The method of claim 9, wherein the software code description further includes a feature toggle, the feature toggle describing a feature that is permitted to be used by the application and including a value identifying whether the feature is enabled or disabled.

12. The method of claim 11, wherein the operations further comprise disabling the feature in the first instance of the application by changing the value in the feature toggle to a value indicating that the feature is disabled, without migrating the first instance of the application to a different version of the application.

13. The method of claim 9, wherein the method is performed by a frontend service in a cloud landscape.

14. The method of claim 13, wherein the provisioning is performed by an application operator in an application lifecycle orchestration component in the cloud landscape.

15. The method of claim 9, wherein the containerized application management service is Kubernetes.

16. The method of claim 9, further comprising:
   detecting a change to the value in the software code description; and
   in response to the detection, automatically migrating the first instance of the application to a version of the application matching the changed value.

17. A non-transitory machine-readable medium storing instructions which, when executed by one or more processors, cause the one or more processors to perform operations comprising:
   obtaining a software code description stored in a database, the software code description including a behavior toggle, the behavior toggle describing a plurality of variants of a behavior and including a value identifying which variant is permitted to be performed by an application;

creating a behavior toggle context identifying the behavior toggle included in the software code description;

updating a custom resource of a first instance of the application, in a containerized application management service, to include the behavior toggle context; and causing provisioning of the application, using the custom resource, the provisioning enabling the behavior by the first instance of the application.

18. The non-transitory machine-readable medium of claim 17, wherein the behavior cannot be disabled in the first instance of the application without migrating the first instance of the application to a different version of the application.

19. The non-transitory machine-readable medium of claim 17, wherein the software code description further includes a feature toggle, the feature toggle describing a feature that is permitted to be used by the application and including a value identifying whether the feature is enabled or disabled.

20. The non-transitory machine-readable medium of claim 19, wherein the operations further comprise disabling the feature in the first instance of the application by changing the value in the feature toggle to a value indicating that the feature is disabled, without migrating the first instance of the application to a different version of the application.

* * * * *